(12) United States Patent
Shaha et al.

(10) Patent No.: US 8,528,748 B2
(45) Date of Patent: Sep. 10, 2013

(54) BICYCLE STAND

(75) Inventors: Kevin Bruce Shaha, Dover, ID (US); Marcus Bosch, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 365 days.

(21) Appl. No.: 12/727,096

(22) Filed: Mar. 18, 2010

(65) Prior Publication Data

US 2010/0237027 A1 Sep. 23, 2010

Related U.S. Application Data

(60) Provisional application No. 61/162,183, filed on Mar. 20, 2009.

(51) Int. Cl.
*A47F 7/00* (2006.01)
(52) U.S. Cl.
USPC ............................................. 211/22; 211/17
(58) Field of Classification Search
USPC ................. 211/17, 18, 19, 20, 21, 22, 23, 24, 211/5; 248/121, 127
See application file for complete search history.

(56) References Cited

U.S. PATENT DOCUMENTS

| | | | | |
|---|---|---|---|---|
| 569,289 A | * | 10/1896 | Lynch ............................ | 211/17 |
| 594,627 A | | 11/1897 | Hewlett | |
| 615,995 A | * | 12/1898 | Leonard ......................... | 211/22 |
| 626,535 A | * | 6/1899 | Gradlmiller ...................... | 410/3 |
| 1,202,444 A | | 10/1916 | Soleau | |
| 3,901,421 A | * | 8/1975 | Kalicki et al. ................ | 224/310 |
| 4,618,035 A | * | 10/1986 | Mao ............................. | 190/18 A |
| 5,078,276 A | * | 1/1992 | Rogge et al. .................... | 211/18 |
| 5,417,629 A | * | 5/1995 | Phipps ............................ | 482/61 |
| 5,477,789 A | * | 12/1995 | Von Gunten .................. | 108/108 |
| 5,634,619 A | * | 6/1997 | Alessi ......................... | 248/219.3 |
| 5,642,820 A | * | 7/1997 | Angeles ........................ | 211/103 |
| 5,862,921 A | * | 1/1999 | Venegas, Jr. .................... | 211/17 |
| 5,996,814 A | * | 12/1999 | Workman et al. ............... | 211/22 |

(Continued)

FOREIGN PATENT DOCUMENTS

EP 1 327 574 A1 7/2003

OTHER PUBLICATIONS

International Searching Authority (ISA/EPO); International Search Report, International application PCT/US2010/027896, mailing date of report May 12, 2010; 4 pages.

*Primary Examiner* — Darnell Jayne
*Assistant Examiner* — Patrick Hawn
(74) *Attorney, Agent, or Firm* — Mark W. Croll; Patricia Chidiac; Beem Patent Law Firm

(57) ABSTRACT

A stand for supporting at least one bicycle may include a plurality of tubular frame members including a plurality of generally linear portions, a plurality of angled portions and a plurality of U-shaped portions. The stand also may include a foot having a generally planar bottom surface and an upper surface adapted for operatively engaging one of the U-shaped portions, a wall attachment for coupling a top of the stand to a wall, and a plurality of holders slidably coupled to the generally linear portions. Each of the holders may comprise a band surrounding a portion of the generally linear portions, a hook extending downward and outward from the band, and compressible portions that hold the hook at a desired position along the generally linear portion. In addition, the frame members may include swaged ends and spring-loaded pin assemblies for easy assembly and disassembly of the stand.

20 Claims, 4 Drawing Sheets

(56) References Cited

U.S. PATENT DOCUMENTS

| | | | |
|---|---|---|---|
| 6,216,882 B1* | 4/2001 | Strunck et al. | 211/18 |
| 6,371,309 B1* | 4/2002 | Smith | 211/22 |
| 6,419,096 B1 | 7/2002 | Shepherd | |
| 6,494,327 B2* | 12/2002 | Huang | 211/17 |
| 6,679,388 B1 | 1/2004 | Chiu | |
| 6,729,478 B1* | 5/2004 | Boers | 211/18 |
| 6,843,380 B1* | 1/2005 | Fickett | 211/22 |
| 6,983,853 B1 | 1/2006 | Fickett | |
| 2006/0065448 A1* | 3/2006 | Hudson | 177/148 |
| 2007/0023367 A1* | 2/2007 | Chung | 211/20 |
| 2007/0034657 A1 | 2/2007 | Murray | |
| 2008/0000848 A1* | 1/2008 | Chiu | 211/21 |
| 2008/0110841 A1* | 5/2008 | Huang | 211/17 |

\* cited by examiner

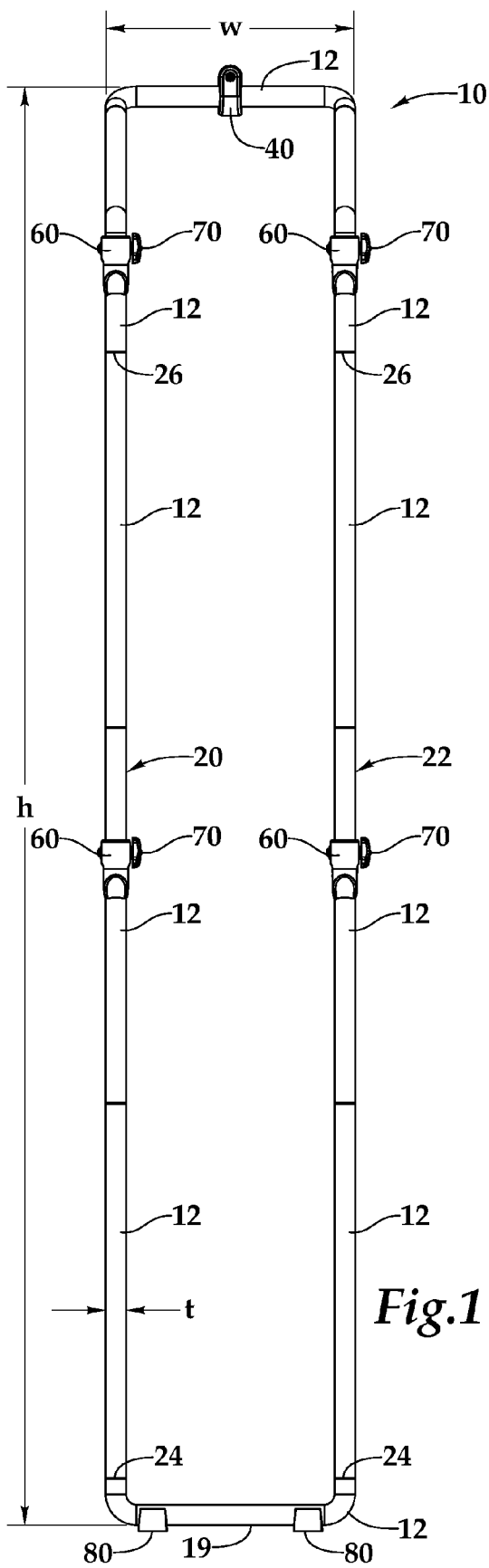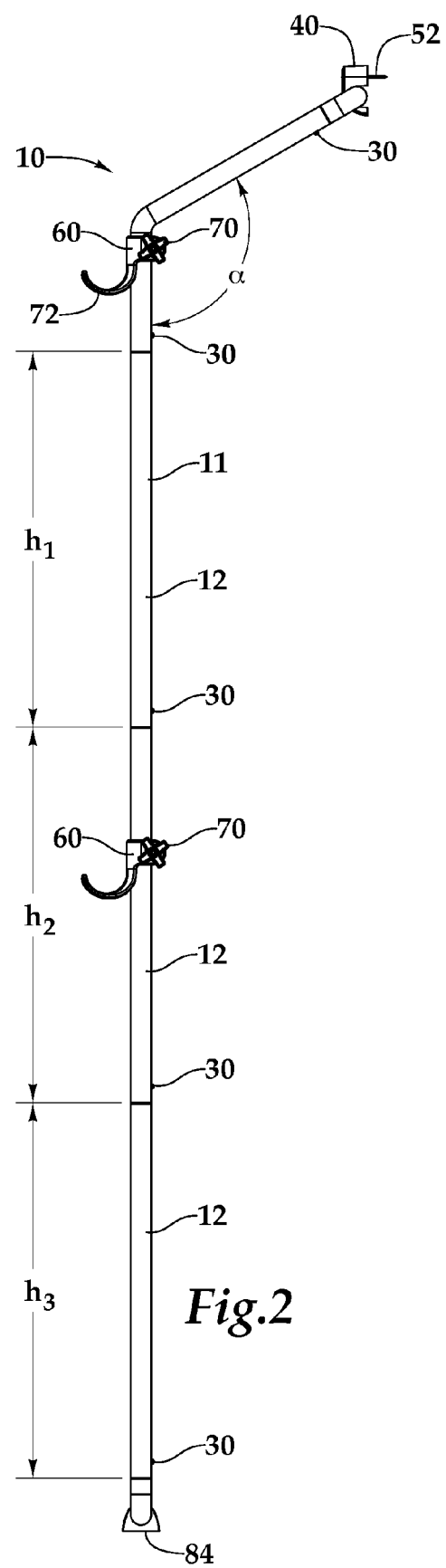

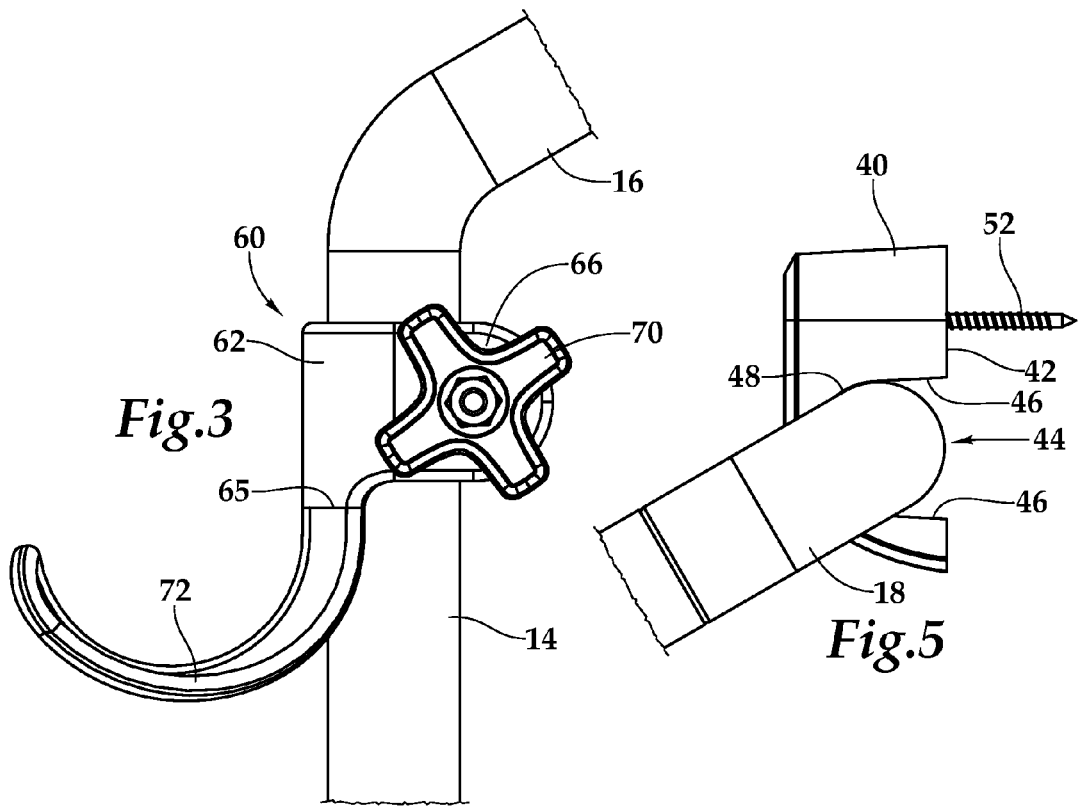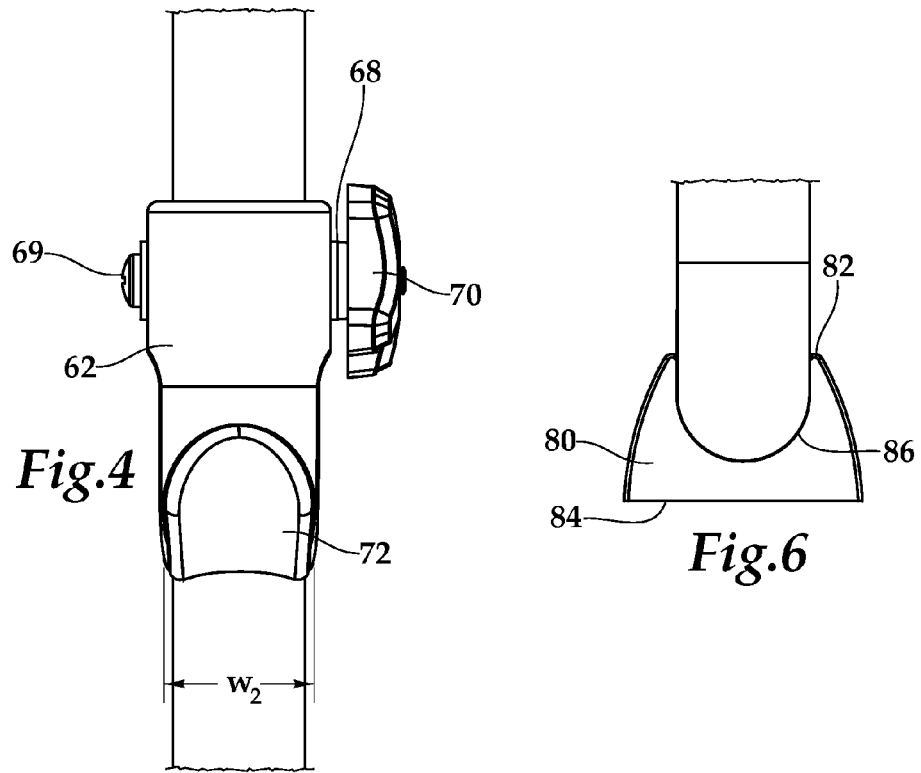

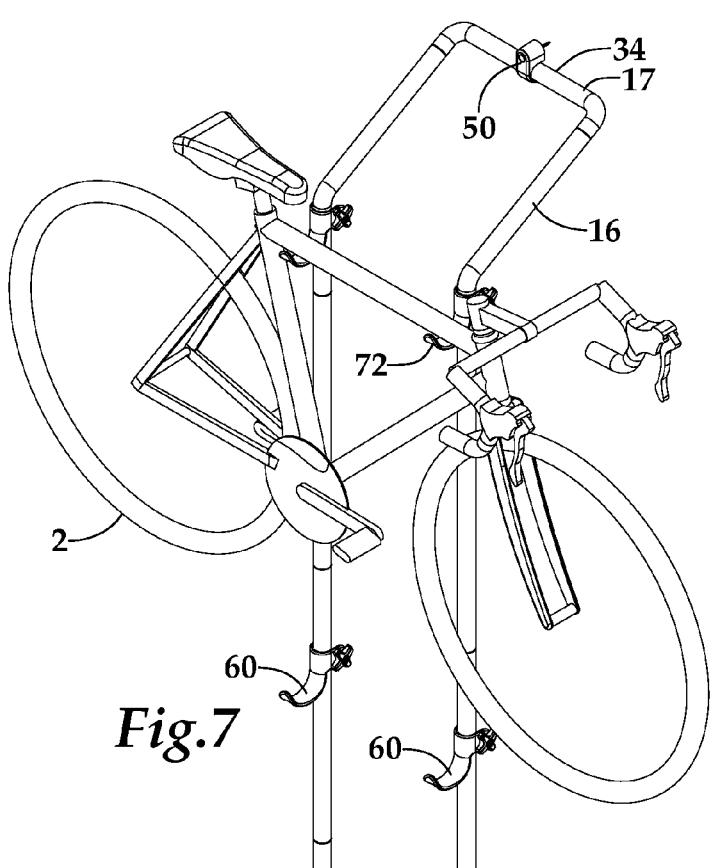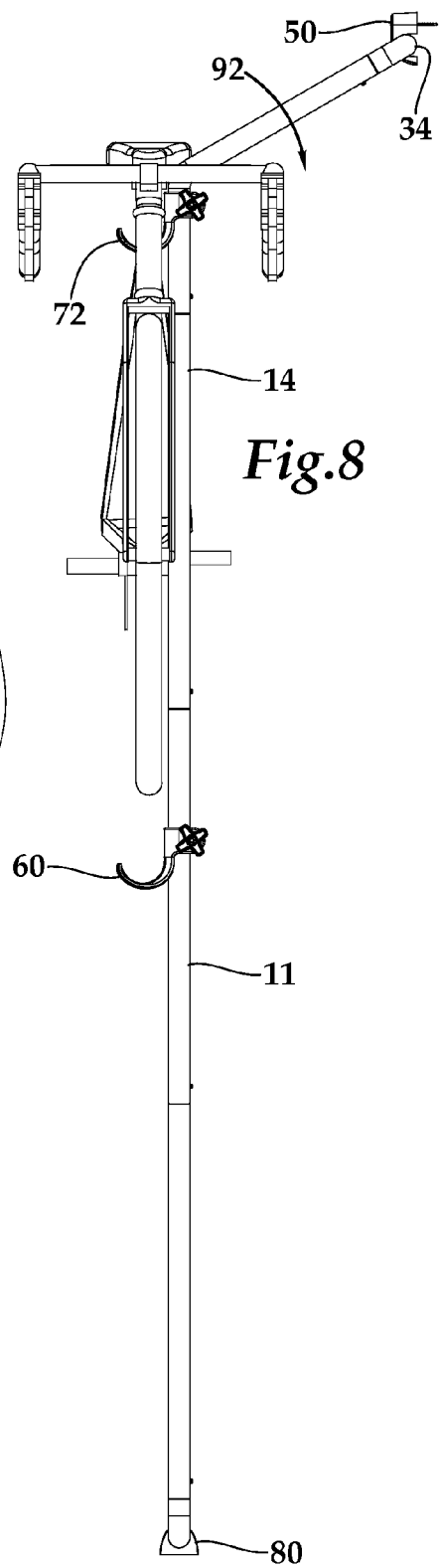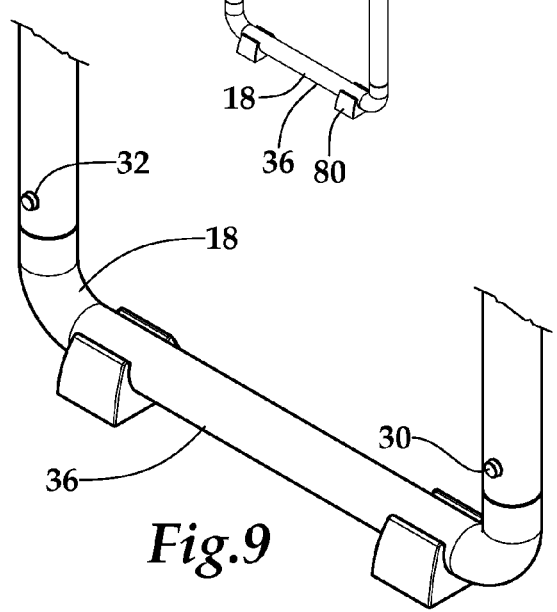

BICYCLE STAND

BACKGROUND OF THE INVENTION

1. Field of the Invention

The present invention is directed to a stand for storing equipment such as a bicycle.

2. Description of the Related Art

Bicycle stands come in several varieties. For example, some stands consist of bases that rest on the floor. One of the tires is inserted into and held by the stand, maintaining the bicycle or bicycles in an upright position. In order to store multiple bicycles, either multiple stands are required or else the bicycles are placed side-by-side, requiring substantially more floor space and, therefore, minimizing the floor space available for other purposes.

Other stands include a frame placed close to a wall with generally parallel bars or arms extending outward therefrom. Oftentimes the bars are placed in predetermined locations or require disassembling a portion of the stand in order to move them. As such, it may be difficult, if not impossible, to adjust the stand to store various-sized bicycles or accommodate users of varying heights. In another instance, a stand may have this frame but with more easily adjustable bars or arms. These stands may require that both supports and bars or arms protrude a substantial distance into the room, providing tripping and/or snagging possibilities.

What is needed is a stand that avoids the drawbacks of traditional bicycle stands.

SUMMARY OF THE INVENTION

In one aspect, a stand for supporting at least one bicycle, comprising a plurality of tubular frame members including a plurality of generally linear portions, a plurality of angled portions and a plurality of U-shaped portions; a foot having a generally planar bottom surface and an upper surface adapted for operatively engaging one of the U-shaped portions; and a plurality of holders slidably coupled to the generally linear portions. The stand further may include a wall attachment for coupling a top of the stand to a wall. Each of the holders may comprise a band surrounding a portion of the generally linear portions, a hook extending downward and outward from the band, a generally planar portion extending from one end of the band, and a second generally planar portion extending from a second end of the band, where the hook may be held at a desired position along the generally linear portion by compressing the generally planar portions.

In another aspect, a stand for holding an object may include a plurality of releasably engaged frame members, including a first plurality of generally linear members, a second plurality of generally linear members, a plurality of angled members and a plurality of U-shaped members, wherein the first plurality of generally linear members are substantially coplanar with the second plurality of generally linear members; a surface-mounting attachment configured to engage one of the U-shaped members and to engage a mounting surface; a first holder slidably coupled to the first plurality of generally linear members; and a second holder slidably coupled to the second plurality of generally linear members. At least one frame member may include a swaged end for engaging the interior of an adjacent frame member, and, preferably, each member in the first plurality of generally linear members and the second plurality of generally linear members may include a swaged end.

The stand also may include a foot having a generally planar bottom surface and an upper surface adapted for operatively engaging a second one of the U-shaped members. In addition, a plurality of spring loaded pins may extend from a plurality of frame members, and a plurality of adjacent frame members may have a plurality of respective openings, where the plurality of frame members are coupled to the plurality of adjacent frame members by releasably engaging the spring loaded pins with the respective openings.

In still another aspect, a stand for holding an object may comprise a plurality of releasably engaged frame members, including a first portion comprising a first plurality of generally linear members having an upper end and a lower end, a second portion comprising a second plurality of generally linear members having an upper end and a lower end, a third portion comprising a member coupling the lower ends of the first and second pluralities of generally linear members, and a fourth portion coupling the upper ends of the first and second pluralities of generally linear members. The frame members may form a frame having a continuous perimeter, and the fourth portion may extend away from a mounting surface such that the first and second portions are spaced from the mounting surface.

The holder may include a plurality of feet coupled to the third portion, the feet including a generally planar lower end and an upper end having an indentation sized for receiving the third portion. In addition, the stand may include a mounting surface attachment having a rear surface with an opening for maintaining the fourth portion between the mounting surface and the mounting surface attachment. Moreover, the stand may include a plurality of holders for slidably engaging the first and second portions, such that the holders may be positionable at any position along the first and second portions.

BRIEF DESCRIPTION OF THE SEVERAL VIEWS OF THE DRAWINGS

FIG. 1 is a front view of one embodiment of a stand for storing a plurality of objects such as bikes in vertical spaced relationship to one another.

FIG. 2 is a side view of the stand of FIG. 1.

FIG. 3 is a side, detail view of a holder used with the stand of FIG. 1.

FIG. 4 is a front, detail view of the holder of FIG. 3.

FIG. 5 is a side, detail view of a wall attachment used with the stand of FIG. 1.

FIG. 6 is a side, detail view of a foot used with the stand of FIG. 1.

FIG. 7 is a front, perspective view of the stand of FIG. 1 with a bicycle supported by a plurality of holders.

FIG. 8 is a side view of the stand and bicycle of FIG. 7.

FIG. 9 is a perspective view of a bottom portion of the stand of FIG. 1.

DETAILED DESCRIPTION

Figure 10:
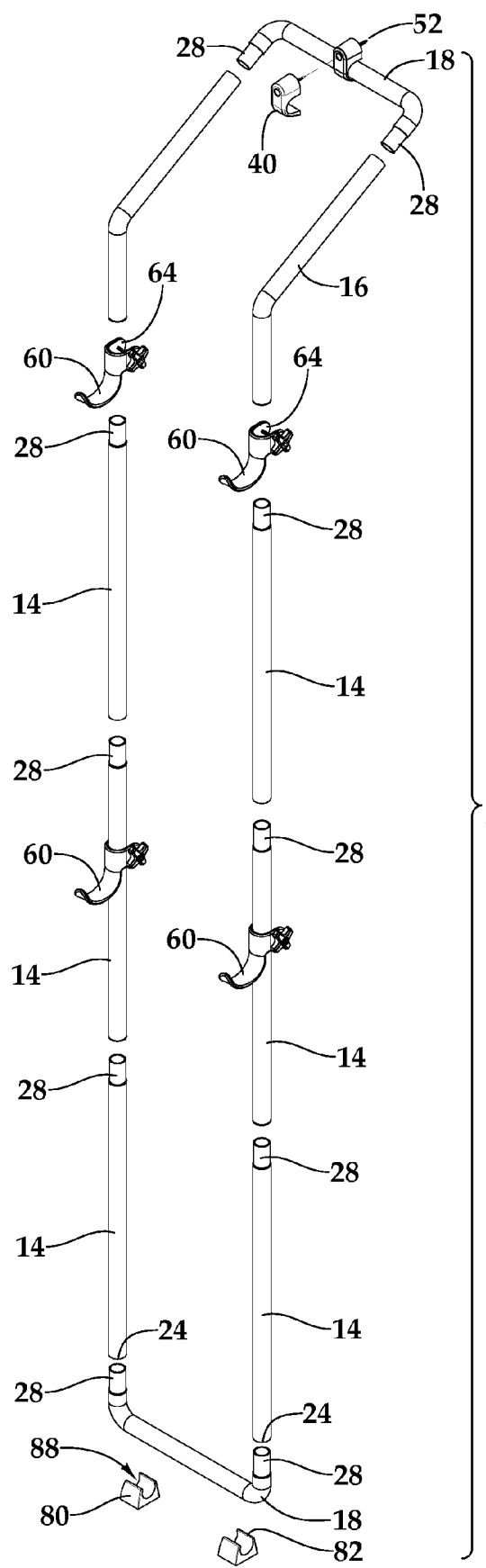
FIG. 10 is an exploded view of the holder of FIG. 1.

In one embodiment, a stand 10 for storing a plurality of bikes 2 comprising a series of interlocking tubular portions 12, a plurality of slidably adjustable arms 60, a wall attachment 40 and a plurality of feet 80. As seen in FIGS. 1-2 and 10, the tubular portions 12 may include a plurality of generally linear portions 14, a plurality of angled portions 16 and a plurality of U-shaped portions 18. Half of the generally linear portions 14 may be coupled to form an extended portion or a side 20, and the second half may be coupled to form a second extended portion or a second side 22. Each side 20, 22 may be made of a plurality of extended portions 14, preferably about 3 portions each. One U-shaped portion 18 may couple the extended portions 20, 22 at their bottoms 24. The angled portions 16 may couple at their tops 26 to a second U-shaped portion 17, and that assembly may couple to the tops of the extended portions. As such, the tubular portions 12 may form a generally continuous frame 11.

Bike stand may benefit from easy assembly requiring fewer parts and fewer tools. For example, tubular portions 12 may be hollow, saving material, manufacture and shipping costs, and each tubular portion 12 may have a substantially equal diameter as that of the other tubular portions 12. Where connections are to be made, the end 28 of one portion may be swaged to fit within the adjacent portion and to frictionally engage the interior surface of the adjacent portion, as seen in FIG. 10. In addition, turning to FIG. 9, tubular portions 12 may couple via a spring-loaded pin 30 in the swaged end 28 and a suitably-sized hole 32 in an adjacent portion. When the swaged end 28 is inserted into the adjacent portion, the pin 30 may retract, and when the pin 30 is aligned with its mating hole 32, it may expand outward, coupling the tubular portions 12.

Upper end 34 of stand 10 simply may lean against wall for support, but preferably stand 10 may include a wall attachment 40 to secure frame to wall, e.g., to secure top of upper U-shaped portion 18 to mounting surface. As seen in FIG. 5, wall attachment 40 may have a rear surface 42 having an opening 44 into which the frame 11 will fit. For example, for a frame element 12 comprising a generally cylindrical tube, the wall attachment 40 may have an arched opening 44 with straight sides 46 and a semicircular top arched portion 48. Both the diameter of the arched portion 48 and the distance between the straight sides 46 may be approximately equal to the outer diameter of the frame element 12. In this way, frame element 12 may fit within the arched portion 48 completely so that the rear surface 42 of the wall attachment 40 may seat substantially flat against the mounting surface. Wall attachment 40 also may include at least one opening 50 for receiving a fastener 52, such as a #10×3" sheet metal screw for engagement with the mounting surface and, preferably, with a support underlying the mounting surface. Wall attachment 40 may be made of any of a variety of materials, including, e.g., acrylonitrile butadiene styrene (abs) or polypropylene.

By providing lateral connections between generally vertical portions 14 via the U-shaped frame portions 18, stand 10 may have increased rigidity and stability, particularly when bikes are loaded or unloaded onto holders 60. For example, if complementary holders 60 are unloaded at different times, one side of stand 10 may experience a load while the other side does not, and the crossbar of U-shaped frame portion 18 may inhibit one of the generally vertical portions 14 from moving relative to the other generally vertical portion 14 due to that load differential.

Additionally, stand 10 may include at least one foot 80 engaged with bottom 19 of lower U-shaped frame portion 18, preferably at least two feet 80 spaced apart from one another. Each foot 80 may be located at the stand lower end 36. Turning to FIG. 6, each foot 80 may have an upper surface 82 including a curved indentation 86 spanning its length, the indentation 86 having a diameter substantially similar to, or slightly larger than, the outside diameter of the lower U-shaped frame portion 18. Conversely, the indentation 86 may be sized slightly smaller than the diameter of the lower U-shaped frame portion 18 to provide an interference fit between foot 80 and frame 11. Preferably, however, indentation 86 may be approximately or slightly more than semicircular so that the width of the opening of the indentation 88 may be less than the diameter of the lower U-shaped portion 18. In the latter case, foot 80 may elastically deform as the frame 11 compresses against it until about half of the frame 11 passes the opening. At that point, the frame 11 may snap into place and be partially enveloped by the indentation 86, preventing the foot 80 from accidentally dislodging.

In addition, each foot 80 may have a generally planar lower surface 84 for engagement with the ground or other surface. As such, feet 80 may be rotatable about lower U-shaped frame portion 18 so as to level feet 80 if ground is inclined. Feet 80 may be made of any of a variety of materials, including, e.g., a thermoplastic elastomer such as thermoplastic rubber or a polypropylene. In one embodiment, foot or feet 80 each may include at least one opening 50 for accepting a fastener to mount foot or feet 80 to the floor.

Turning now to FIGS. 3-4, stand 10 further may include a plurality of adjustable holders 60 on which bicycles may be mounted. Preferably, e.g., stand 10 may include four holders 60, two on each generally vertical portion 14, where complementary holders 60, i.e., one on each portion 14, may cooperate to support an object such as a bicycle.

Holders 60 may comprise a band 62 having an inner surface 64 sized and shaped approximately equally to the outer surface of the generally linear portions 14 of the frame 11. For example, in the case of a tubular frame 11, the band 62 may be semicircular, with an inner diameter approximately equal to the frame outer diameter, although band 62 may be slightly larger than frame 11 to allow for movement along frame 11. Holders 60 also may include a plurality of rearwardly extending portions 66 at opposite ends of band 62, the rearwardly extending portions 66 including hardware 68 for compressing the portions 66 toward each other, securing the holders 60 to the frame 11 in a desired location. In one embodiment, the hardware 68 may include a fastener 69, a washer and a nut, such as a wing nut or a rotatable handle 70 having a threaded interior surface. Tightening the nut draws the rearwardly extending portions 66 toward one another, compressing the holder 60 against the frame 11 and holding the holder 60 in place at a desired position on the frame 11. Similarly, loosening the nut relaxes the compressive force on the portions 66, allowing the holder 60 to slide along frame to a new position. Holders 60 may be able to move along the length of substantially vertical portions 14 of frame 11 to provide a user with infinite adjustability to locate holder 60 at any desired point along those portions 14. In addition, complementary holders 60 may be located at similar heights to support a generally horizontal bicycle frame crossbar member or may be offset to support an angled bicycle crossbar.

As seen in FIGS. 7-8, angled portions 16 may cause generally vertical portions 14 to be spaced from mounting surface, providing a gap 92 in which handlebar of bicycle may fit, allowing bicycle to be stored close to wall and minimizing the amount of floor space the stand 10 takes up. Similarly, inside pedal of bicycle may extend inward beyond the generally vertical portions 14 and be located inside the gap 92 when bicycle is mounted. Moreover, because the generally vertical portions 14 extend substantially to the floor and the holders 60 have minimal outward protrusion beyond those portions, the outward extent of the stand 10 is conspicuous and presents a user with a lower possibility of walking into the stand 10 or tripping over the stand 10 when no objects are loaded onto it.

Holders 60 additionally may include a hook 72 protruding from a lower end 65 of the band 64. Hook 72 may be substantially semicircular, having a diameter sized to accept a variety of different diameter bicycle frames. In addition, as seen in FIG. 4, hooks 72 may have a width, w2, approximately equal to the width or diameter of frame elements 12 in order to provide increased surface area on which the bicycle may bear, thereby decreasing pressure exerted on the bicycle, and vice versa, at the contact area. Moreover, by retaining hooks 72 closer to frame 11, loading on hooks 72 primarily may have a shear component as opposed to being predominantly in the form of a larger bending moment, which may be advantageous since many mounting substrates have a higher shear loading limit than a bending limit.

Holders 60 may be a metal material to provide enough strength and rigidity to support weight of objects mounted on holders. In addition, holders 60 may be dipped in a rubberized or plasticized coating to provide cushioning and scratch resistance.

In one embodiment, frame 11 may comprise a plurality of tubular steel elements 12. Tubes may have a diameter, t, between about ½" and about 2", preferably about 1". Tubes also may be powder coated to provide a tough, durable outer surface. In addition, as seen in FIG. 2, generally linear portions 14 of frame 11 may comprise a series of smaller elements, each of which may have a length or height, h1, h2 or h3, between about 12" and about 24", preferably between about 16" and about 20", and in one embodiment about 18". Angled portion 16 may be bent an amount, a, between about 135 degrees and about 170 degrees, preferably between about 145 degrees and about 165 degrees.

Stand 10 may have an overall height, h, between about 60" and about 84", preferably between about 66" and about 78", and in one embodiment about 72". Stand 10 also may have a width, w, between about 12" wide and about 30" wide, preferably between about 12" wide and about 24" wide, and in one embodiment about 18" wide. In addition, stand 10 may be spaced a distance, d, between about 6" from wall and about 18" from wall, preferably about 12" from wall.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A bicycle stand, comprising:
   a plurality of interlocking tubular frame members including a plurality of generally linear portions, a plurality of angled portions and a plurality of U-shaped portions, each U-shaped portion having a first end and a second end, wherein a bottom of a first generally linear portions couples to a first U-shaped portion at said first end and a bottom of a second generally linear portion couples to said first U-shaped portion at said second end, said first U-shaped portion providing a lateral connection between said plurality of generally linear portions, said first U-shaped portion being located entirely a plane passing through all points of said plurality of generally linear portions;
   wherein a bottom of a first angled portion couples to a top of a third generally linear portion and a top of said first angled portion couples to a second U-shaped portion at a first end, and a bottom of a second angled portion couples to a top of a fourth generally linear portion and a top of said second angled portion couples to a second end of said second U-shaped portion;
   a foot having a generally planar bottom surface and an upper surface adapted for operatively engaging a crosspiece of said first U-shaped portion; and
   a pair of holders, each holder slidably coupled to a corresponding linear portion and configured to engage a bicycle in a horizontal configuration.

2. A stand according to claim 1, further comprising a second foot substantially similar to said foot.

3. A stand according to claim 1, further comprising a wall attachment for coupling a top of said stand to a wall.

4. A stand according to claim 1, wherein said plurality of holders comprise a rubberized coating.

5. A stand according to claim 1, wherein each of said holders comprises a band surrounding a portion of an outer surface of a corresponding one of said generally linear portions and a hook extending from a lower end of said band.

6. A stand according to claim 1, wherein each of said holders comprises a band surrounding a portion of an outer surface of a corresponding one of said generally linear portions, a generally planar portion extending from one end of said band and a second generally planar portion extending from a second end of said band, and further wherein said holder is held at a desired position along said generally linear portion by compressing said generally planar portions.

7. A stand for holding an object, comprising:
   a plurality of releasably engaged, tubular frame members, including a first plurality of generally linear members, a second plurality of generally linear members, a plurality of angled members and a plurality of U-shaped members having a first end and a second end,
   wherein a bottom of one of said first plurality of generally linear members directly couples to said first end of a lower U-shaped member and a bottom of one of said second plurality of generally linear members directly couples to said second end of said lower U-shaped member, said lower U-shaped member providing a lateral connection between said first plurality of generally linear members and said second plurality of generally linearly members, said lower U-shaped members being located entirely in a plane passing through all points of said first plurality of generally linear members and said second plurality of generally linear members and,
   wherein said first plurality of generally linear members are substantially coplanar with said second plurality of generally linear members;
   wherein a top of one of said first plurality of generally linear members couples to a bottom of a first angled member and a top of one of said second plurality of generally linear members couples to a bottom of a second angled member and,
   wherein said first end of an upper U-shaped member couples to a top end of said first angled member, and said second end of said upper U-shaped member couples to a top end of said second angled member;
   a surface-mounting attachment configured to engage said upper U-shaped member and to engage a mounting surface;
   a first holder configured to hold2 said object in a horizontal configuration, said first holder slidably coupled to at least one of said first plurality of generally linear members; and
   a second holder configured to hold said object in a horizontal configuration, said second holder slidably coupled to at least one of said second plurality of generally linear members.

8. A stand according to claim 7, further comprising:
   a foot having a generally planar bottom surface and an upper surface adapted for operatively engaging said lower U-shaped member.

9. A stand according to claim 7, wherein at least one frame member includes a swaged end for engaging the interior of an adjacent frame member.

10. A stand according to claim 7, wherein each member in said first plurality of generally linear members and said second plurality of generally linear members includes a swaged end.

11. A stand according to claim 7, further comprising a plurality of spring loaded pins extending from at least some of said plurality of releasably engaged frame members and a plurality of respective openings in a plurality of adjacent frame members, wherein said plurality of frame members are coupled to said plurality of adjacent frame members by releasably engaging said spring loaded pins with said respective openings.

12. A stand according to claim 7, said surface-mounting attachment including an opening on a rear surface for engaging and surrounding at least a portion of said upper U-shaped member.

13. A stand according to claim 7, wherein said first holder comprises a band surrounding a portion of an outer surface of a generally linear member, a plurality of portions extending rearward of said generally linear member, and a hook extending away from said generally linear member.

14. A stand according to claim 13, said first holder further comprising a fastener extending between said plurality of rearward extending portions and a handle coupled to said fastener, whereby tightening said fastener decreases a distance between said plurality of rearward extending portions.

15. A bicycle stand, comprising:
a frame consisting essentially of a plurality of releasably engaged frame portions including a first portion comprising a first plurality of generally linear members, the first portion having an upper end and a lower end, a second portion comprising a second plurality of generally linear members, the second portion having an upper end and a lower end, a third portion comprising a member having a first end and a second end, said third portion coupling to said lower end of said first portion at said first end, said third portion coupling to said lower end of said second portion at said second end, and a fourth portion comprising a member having a first end and a second end, said fourth portion coupling to said upper end of said first portion at said first end, said fourth portion coupling to said upper end of said second portion at said second end, wherein said third portion provides a lateral connection between said first portion and said second portion, said third portion being located entirely in a plane passing through all points of said first and said second portions;

wherein said frame has a continuous perimeter that comprises a path along the entire length of said first, second, third, and fourth portions; and wherein said fourth portion extends away from a mounting surface at a fixed angle and said first and second portions are spaced from said mounting surface;

the stand further comprising a surface-mounting attachment configured to engage said fourth portion and to engage said mounting surface; and two pairs of holders with a first holder from each pair slidably engaging said first portion and a second holder from each pair slidably engaging said second portion, each pair of holders configured to hold a bicycle in a horizontal configuration.

16. A stand according to claim 15, further comprising a plurality of feet coupled to said third portion, said feet including a generally planar lower end and an upper end having an indentation sized for receiving said third portion.

17. A stand according to claim 15, wherein said surface mounting attachment has a rear surface with an opening for maintaining said fourth portion between said mounting surface and said mounting surface attachment.

18. A stand according to claim 15, said holders including spaced-apart arms, a threaded portion between said arms, and a handle rotatably coupled to said threaded portion, wherein rotating said handle compresses said arms together.

19. A stand according to claim 15, wherein at least a portion of said holders includes a rubberized or plasticized coating.

20. A stand according to claim 1, further comprising a second pair of holders, each one of said second pair of holders slidably coupled to a corresponding linear portion and configured to engage a second bicycle in a horizontal configuration.

* * * * *